US008965675B2

(12) United States Patent
Ignatin

(10) Patent No.: US 8,965,675 B2
(45) Date of Patent: Feb. 24, 2015

(54) ESTIMATION OF ROADWAY TRAVEL INFORMATION BASED ON HISTORICAL TRAVEL DATA

(71) Applicant: Broadcom Corporation, Irvine, CA (US)

(72) Inventor: Gary R. Ignatin, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/871,185

(22) Filed: Apr. 26, 2013

(65) Prior Publication Data

US 2013/0253828 A1  Sep. 26, 2013

Related U.S. Application Data

(63) Continuation of application No. 11/013,650, filed on Dec. 15, 2004, now Pat. No. 8,452,526.

(60) Provisional application No. 60/530,086, filed on Dec. 15, 2003.

(51) Int. Cl.
*G01C 21/34* (2006.01)
*G01C 21/36* (2006.01)
*G08G 1/0968* (2006.01)

(52) U.S. Cl.
CPC ........ *G01C 21/3453* (2013.01); *G01C 21/3691* (2013.01); *G08G 1/096811* (2013.01); *G08G 1/096844* (2013.01)
USPC ........... 701/202; 701/400; 701/410; 701/414; 701/415; 701/420; 701/423; 701/439; 701/451; 701/467

(58) Field of Classification Search
None
See application file for complete search history.

(56) References Cited

U.S. PATENT DOCUMENTS

| | | | |
|---|---|---|---|
| 5,648,768 A | 7/1997 | Bouve | |
| 5,875,412 A | 2/1999 | Sulich et al. | |
| 6,032,121 A * | 2/2000 | Dietrich et al. | 705/7.22 |
| 6,091,956 A | 7/2000 | Hollenberg | |
| 6,169,515 B1 * | 1/2001 | Mannings et al. | 342/357.31 |
| 6,169,955 B1 | 1/2001 | Fultz | |
| 6,321,158 B1 * | 11/2001 | DeLorme et al. | 701/426 |
| 6,411,891 B1 | 6/2002 | Jones | |
| 6,427,115 B1 * | 7/2002 | Sekiyama | 701/526 |
| 6,526,335 B1 * | 2/2003 | Treyz et al. | 701/1 |
| 6,580,375 B2 * | 6/2003 | Ruhl | 340/988 |
| 6,662,016 B1 | 12/2003 | Buckham et al. | |
| 6,745,125 B2 * | 6/2004 | Saraga et al. | 701/465 |
| 6,829,532 B2 | 12/2004 | Obradovich et al. | |
| 6,868,335 B2 | 3/2005 | Obradovich et al. | |

(Continued)

*Primary Examiner* — Jonathan M Dager
(74) *Attorney, Agent, or Firm* — Sterne, Kessler, Goldstein & Fox PLLC

(57) ABSTRACT

A system for navigation along a desired route on a desired future date may include a map interface operable to display a traffic condition and a travel time received via a communication network, and an automobile navigation network communicatively coupled to the communication network. The automobile navigation network may estimate the traffic condition and the travel time for travel along the desired route on the desired future date based on historical travel information, current traffic information and current weather information. Information regarding the estimated travel conditions may be automatically communicated to the map interface. The traffic condition may include geographic location information and/or route information. The historical travel information may include historical traffic information.

17 Claims, 10 Drawing Sheets

(56) References Cited

U.S. PATENT DOCUMENTS

| | | | |
|---|---|---|---|
| 6,879,907 | B2 | 4/2005 | Feldman et al. |
| 7,356,392 | B2 | 4/2008 | Hubbard et al. |
| 7,363,126 | B1* | 4/2008 | Zhong et al. ............... 701/25 |
| 7,421,397 | B2* | 9/2008 | Podgurny et al. .......... 705/335 |
| 7,433,889 | B1* | 10/2008 | Barton ........................... 1/1 |
| 7,809,360 | B2* | 10/2010 | Agrawal et al. ........... 455/414.1 |
| 8,229,658 | B1* | 7/2012 | Dabell ....................... 701/117 |
| 2001/0037174 | A1* | 11/2001 | Dickerson ................. 701/200 |
| 2002/0026278 | A1 | 2/2002 | Feldman et al. |
| 2002/0091486 | A1* | 7/2002 | Hubschneider et al. ...... 701/209 |
| 2002/0177946 | A1* | 11/2002 | Ueno ......................... 701/209 |
| 2003/0033078 | A1* | 2/2003 | Kita et al. ................... 701/117 |
| 2003/0065442 | A1* | 4/2003 | Touney ....................... 701/210 |
| 2003/0135304 | A1* | 7/2003 | Sroub et al. .................... 701/1 |
| 2003/0182052 | A1* | 9/2003 | DeLorme et al. ........... 701/201 |
| 2004/0093155 | A1* | 5/2004 | Simonds et al. ............ 701/200 |
| 2004/0095237 | A1 | 5/2004 | Chen et al. |
| 2004/0193367 | A1 | 9/2004 | Cline |
| 2005/0015197 | A1* | 1/2005 | Ohtsuji et al. ............. 701/202 |
| 2005/0027442 | A1* | 2/2005 | Kelley et al. ............... 701/202 |
| 2005/0027447 | A1* | 2/2005 | Hirose et al. ............... 701/210 |
| 2005/0043880 | A1* | 2/2005 | Yamane et al. ............. 701/200 |
| 2005/0096840 | A1 | 5/2005 | Simske |
| 2005/0096842 | A1* | 5/2005 | Tashiro ...................... 701/210 |
| 2005/0248444 | A1 | 11/2005 | Joao |
| 2006/0026170 | A1* | 2/2006 | Kreitler et al. ............... 707/10 |
| 2006/0064235 | A1* | 3/2006 | Ishikawa et al. ............ 701/117 |
| 2006/0178807 | A1* | 8/2006 | Kato et al. ................... 701/117 |
| 2007/0024469 | A1 | 2/2007 | Chou |
| 2007/0049260 | A1* | 3/2007 | Yuhara et al. ............. 455/414.3 |
| 2007/0155404 | A1* | 7/2007 | Yamane et al. ........... 455/456.1 |
| 2007/0159355 | A1* | 7/2007 | Kelly et al. ................. 340/905 |
| 2007/0219707 | A1* | 9/2007 | Auxer et al. ................ 701/202 |
| 2007/0296574 | A1 | 12/2007 | Smith et al. |
| 2008/0071466 | A1* | 3/2008 | Downs et al. ............... 701/117 |
| 2010/0318287 | A1* | 12/2010 | Kraft et al. ................. 701/200 |
| 2011/0015851 | A1* | 1/2011 | Burr et al. .................. 701/117 |
| 2011/0264363 | A1* | 10/2011 | Cabral ....................... 701/200 |
| 2013/0297551 | A1* | 11/2013 | Smith et al. .................. 706/48 |

* cited by examiner

ESTIMATION OF ROADWAY TRAVEL INFORMATION BASED ON HISTORICAL TRAVEL DATA

RELATED APPLICATIONS

This application is a continuation of U.S. patent application Ser. No. 11/013,650 filed Dec. 15, 2004, which makes reference to, claims priority to, and claims the benefit of U.S. Provisional Patent Application Ser. No. 60/530,086, entitled "Estimation Of Roadway Travel Information Based On Historical Travel Data", filed Dec. 15, 2003, the complete subject matter of which is hereby incorporated herein by reference, in its entirety.

INCORPORATION BY REFERENCE

In addition, the applicant hereby incorporates the complete subject matter herein by reference, in its entirety, of U.S. patent application Ser. No. 11/736,819, entitled "Roadway Travel Data Exchange Network", filed Dec. 15, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Vehicles currently may use navigation systems to display their present location on a map and to provide driving directions from one location to another. The driving directions may be provided immediately before initiating a trip, or several days prior to the planned trip. Internet mapping web sites may also be utilized in order to obtain a map of a specific location, or driving directions from one location to another. The Internet mapping web site may also be utilized in printing the driving directions so that they are used at a future time, whenever the trip takes place. Driving directions provided by a navigation system, or by an Internet mapping web site, may provide additional detail for the planned trip from one location to another. For example, a printout with turn-by-turn directions may be provided, pointing out a "fastest," or a "shortest," route. However, the driving directions are often times inaccurate or not optimal. A "fastest route" direction for travel between two locations provided by a navigation system, or by an Internet mapping web site, is not always the fastest.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods for estimation of travel conditions along a desired route on a desired date. In one embodiment, a system for estimating travel conditions may comprise, for example, a communication network; an automobile navigation system communicatively coupled to the communication network, the automobile navigation system for specifying a future travel information for travel along the desired route on the desired date; and a processor communicatively coupled to the communication network, the processor estimating travel conditions associated with the desired route on the desired date, and the processor performing said estimation by correlating the future travel information with historical travel information.

A system that processes vehicular information may comprise a communication network, a mobile device communicatively coupled to the communication network, and a processor communicatively coupled to the communication network, the processor estimating a first set of travel information associated with the mobile device, and the processor performing said estimation by correlating a second set of travel information with historical travel information. The first set of travel information may be automatically pushed to the mobile device. The processor may estimate the first set of travel information after a request for travel information is communicated by the mobile device to said processor via the communication network. The first set of travel information may comprise a traffic conditions estimate and/or a fastest route estimate.

The second set of travel information may comprise current geographic location information and/or future geographic location information. The communication network may comprise a broadband data packet network. The mobile device may be adapted to automatically determine the second set of travel information, where the second set of travel information may be entered via the mobile device. The mobile device may be installed in an automobile. The historical travel information may comprise historical traffic information and/or historical weather information. A travel information delivery system may be provided, the travel information delivery system for delivering the estimated first set of travel information.

In another embodiment, a method in accordance with the present invention may comprise, for example, one or more of the following: transmitting a request for travel information to a travel processing system via a communication network; correlating travel information and historical travel information; and generating an estimate of the requested travel information based on the correlated travel information and historical travel information. The travel information may comprise a current route information and/or a future route information. The estimate of requested travel information may comprise a weather conditions estimate and/or a shortest route estimate. The communication network may comprise a broadband data packet network. The estimate of the requested travel information may be delivered. The estimate may be delivered to an automobile navigation system and/or to a communication device.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to estimation of travel conditions in a roadway travel data exchange network. In particular, certain embodiments of the present invention enable estimation of travel information by correlating current travel information and historical travel information, and delivery of the estimated travel information.

Figure 1:
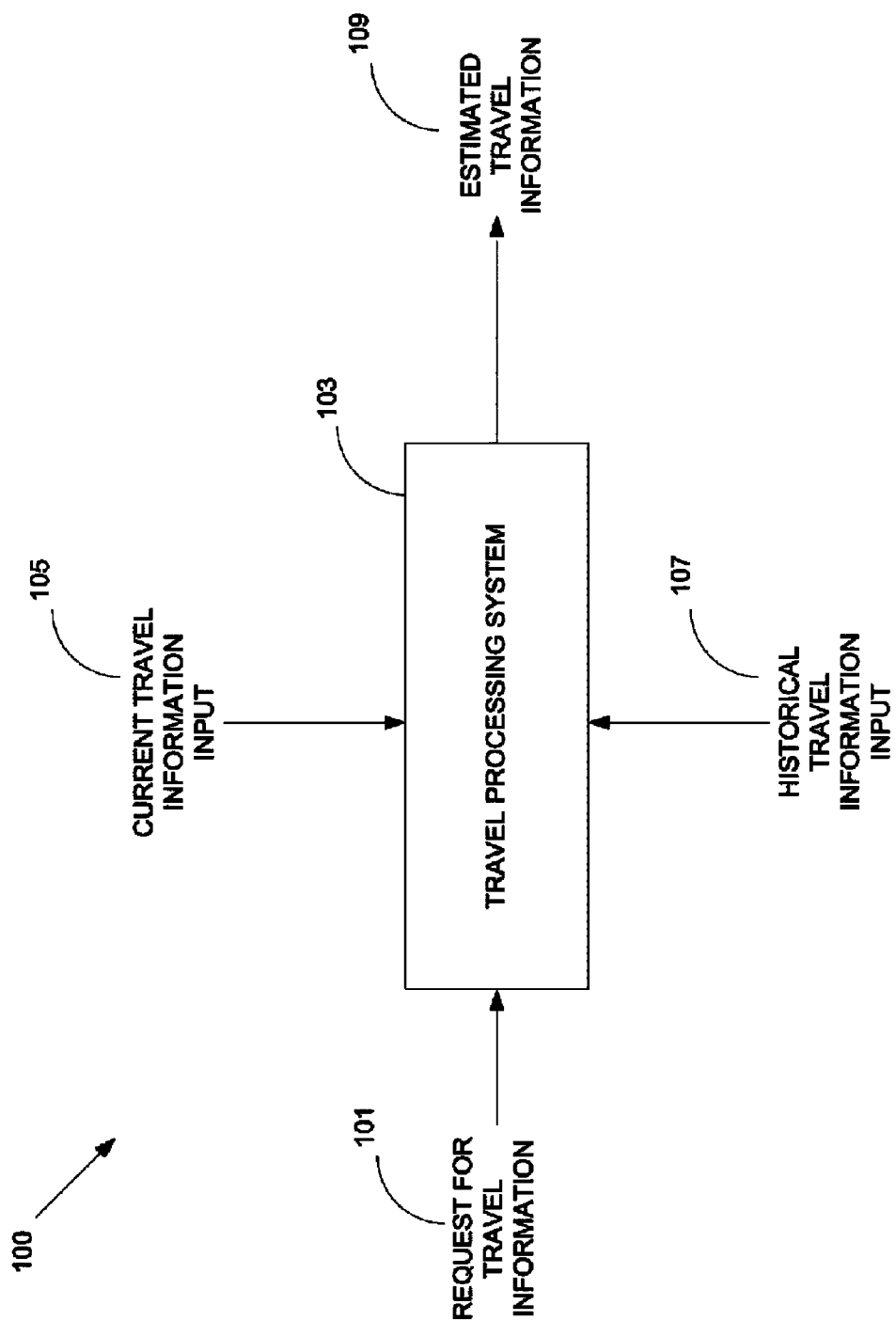
FIG. 1 is a functional diagram illustrating the general functionality of a system for estimating travel conditions in a roadway travel data exchange network, in accordance with various aspects of the present invention.

FIG. 1 is a functional diagram illustrating the general functionality of a system for estimating travel conditions 100 in a roadway travel data exchange network, in accordance with various aspects of the present invention. More specifically, the system 100 comprises a travel processing system 103 for estimating travel information. The travel processing system 103 generates the estimated travel information 109 by correlating current travel information 105 and historical travel information 107. The estimated travel information 109 is generated by the travel processing system 103 either automatically, or upon receiving a request for travel information 101. The travel processing system 103 may be software, hardware, firmware, or any combination thereof.

The request for travel information 101 may comprise a request for travel information associated with a future geographic location (e.g., a location, which will be visited during a future travel), a future time information (e.g., the time of a future travel), and/or a future route information (e.g., a specific route, which will be used during a future travel), including future travel conditions along the future route.

The current travel information input 105 may comprise at least one of a real-time travel data, a current weather forecast, a current geographic location, a current time information, and/or a current route information.

The historical travel information input 107 is at least one of a historical traffic information and a historical weather information. The historical traffic information and the historical weather information can be further specified according to a geographic location and/or a specific date. The estimated travel information 109 is at least one of a traffic conditions estimate, a weather conditions estimate, a fastest route estimate, and a shortest route estimate.

In an embodiment of the present invention, a request for travel information 101 associated with future traffic and weather conditions along a specific route on a specific future date is communicated to the travel processing system 103. The travel processing system 103 may then generate an estimate of travel information by correlating the specific date and route information to a historical travel information associated with historical traffic and weather conditions along the specific route for the specific day, but during past years. The travel processing system 103 may also generate an estimate of travel information by correlating the specific date and route information to current travel information associated with the specific route, such as predicted weather forecast and/or current road conditions information (e.g., road closures), for example.

In another embodiment of the present invention, a user on the roadway travel data exchange network may request, for example, an estimate of the fastest route for a trip between location A and location B, which is to take place on an upcoming holiday. The travel processing system 103 may take into account historical travel information for that specific holiday. For example, the travel processing system may consider the average temperature and precipitation for that day for past years. In addition, the estimation system may use historical travel data and base the estimate on the general travel conditions on the same holiday for the route A-B for past years.

Once the trip from A to B has started, the travel processing system 103 may continuously process any available real-time data for current weather and travel conditions along the route A-B. If the travel processing system receives real-time data that is contrary to the estimated travel information 109, the travel processing system may perform another correlation and provide a second estimate of travel information based on a most recent real-time travel data input. For example, on the day of the travel from A to B, there may be a road construction project blocking all lanes of the highway between A and B. The travel processing system 103 may then recalculate a new "fastest route" estimate based on this new real-time travel information.

A presently active vehicle, or user, on the roadway travel data exchange network may request, for example, an estimate of present, or future, travel information. A future user, who is presently not active on the roadway travel data exchange network, may also request an estimate of travel information that may relate, for example, to a future trip between two locations.

Real-time travel data, which is related to traffic and weather, may be collected and stored on a storage and processing system in accordance with an embodiment of the present invention. For example, the storage and processing system may collect and store real-time traffic data and real-time weather data. After a certain period of time, the storage and processing system may, for example, save the real-time data as historical data and transfer it to a separate database. In this way, the storage and processing system may at all times have a plurality of databases available for access, where some databases may be associated with real-time data and other databases may be associated with historical data. Depending on the type of estimate that is requested, different types of data from the information processing system may be used by the travel processing system 103.

Figure 2:
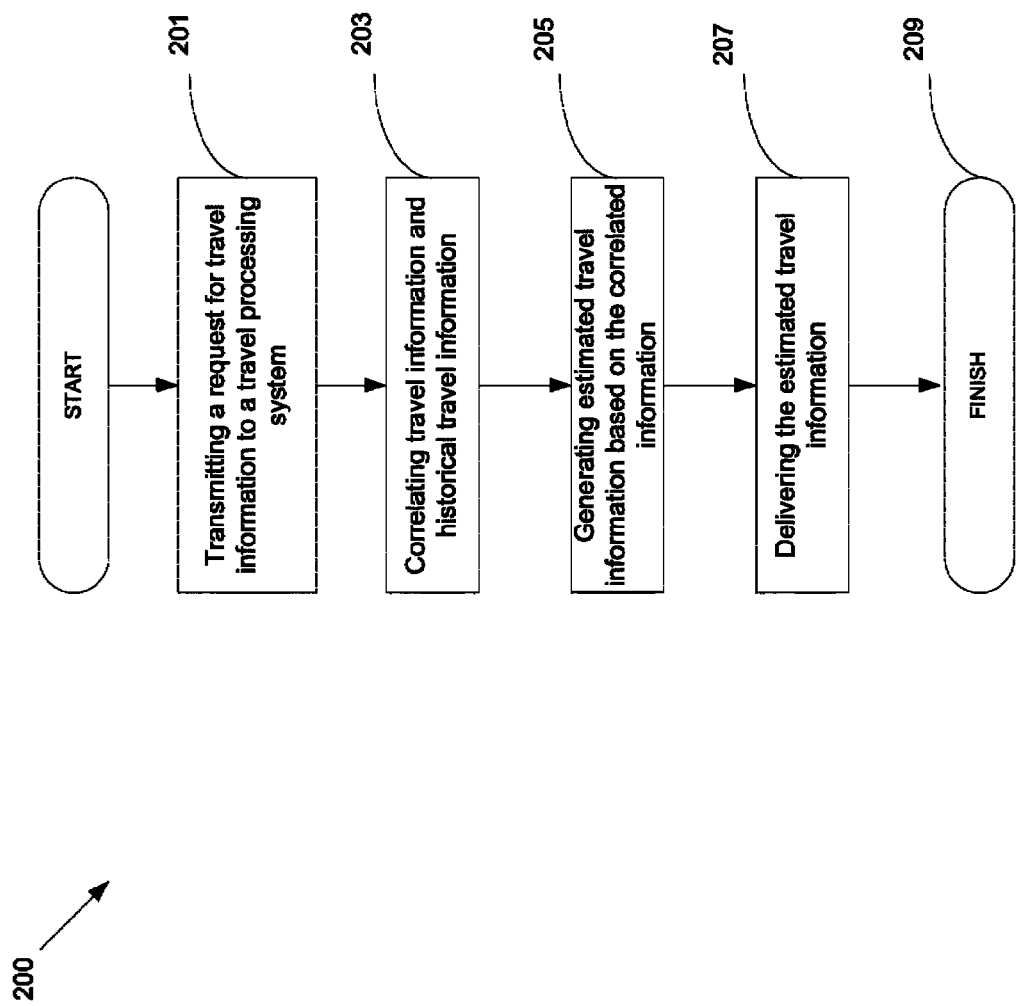
FIG. 2 is a flowchart illustrating an embodiment of a method for estimation of travel information in the system of FIG. 1, in accordance with various aspects of the present invention.

FIG. 2 is a flowchart illustrating an embodiment of a method 200 for estimation of travel information in the system of FIG. 1, in accordance with various aspects of the present invention. In step 201, a request for travel information is transmitted to a travel processing system. The request may be transmitted, for example, by an active vehicle on the roadway travel data exchange network, or by a user who is not currently active, or traveling in a vehicle, but who plans to travel in the future. The request may also relate to an estimate for travel information for a future trip between two locations which is to take place on a given date at a given time.

In step 203, the travel processing system correlates travel information with historical travel information. The estimate of travel information is generated by the travel processing system in step 205, and it is based upon the correlated travel information and historical travel information. In step 207, after the estimate is generated, the travel processing system delivers the estimate of travel information. The estimate may be delivered directly to the requesting user, or it may be delivered to a delivery system communicatively coupled to the travel processing system.

Figure 3:
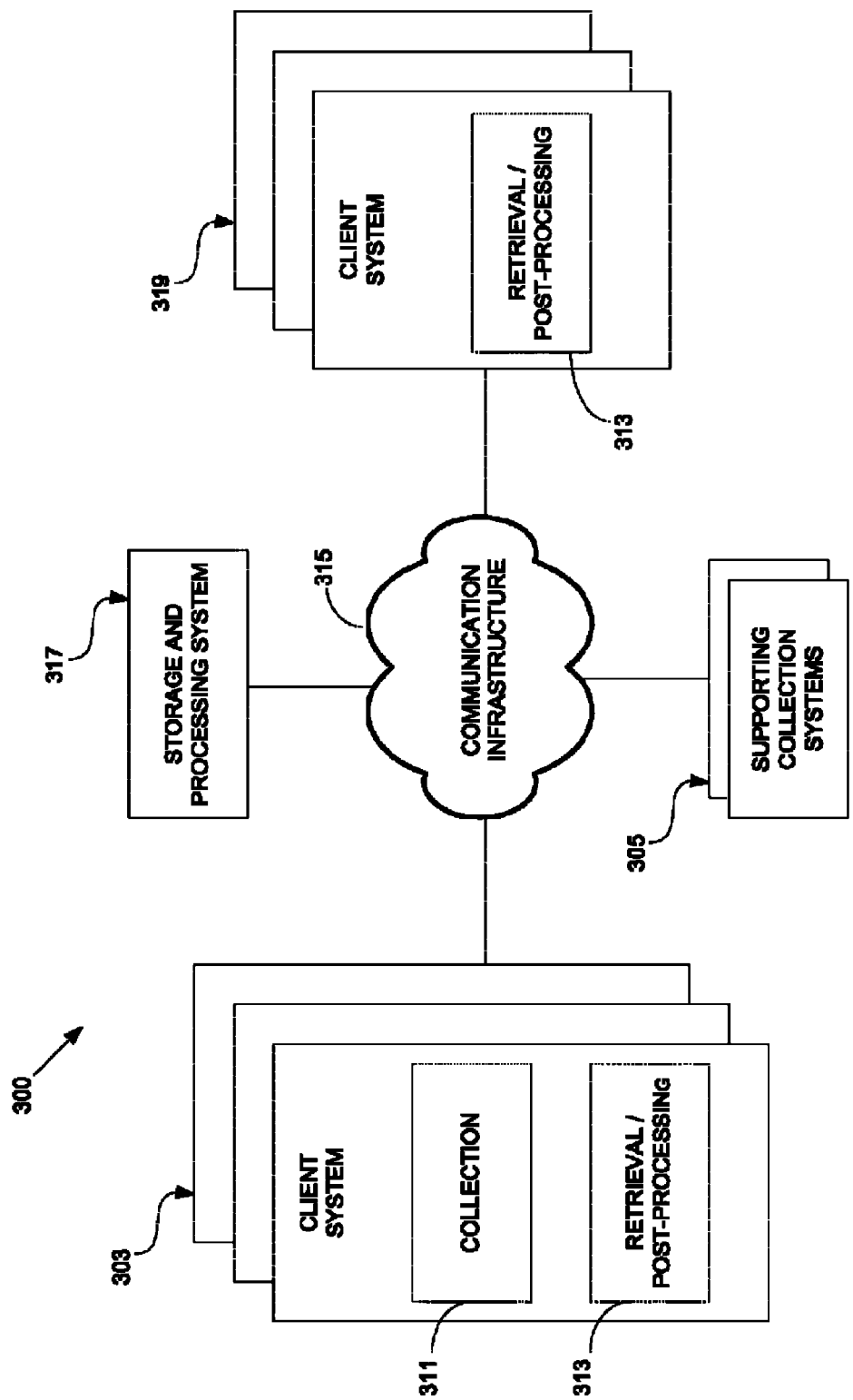
FIG. 3 is a diagram illustrating an embodiment of a roadway travel data exchange network supporting collection, processing and delivery of travel data, in accordance with various aspects of the present invention.

FIG. 3 is a diagram illustrating a roadway travel data exchange network 300 supporting collection, processing and exchange of travel data, in accordance with various aspects of the present invention. The roadway travel data exchange network 300 comprises a communication infrastructure 315, pluralities of client systems 303 and 319, supporting collection systems 305, and a storage and processing system 317. The plurality of client systems 303 comprise collection systems 311 and retrieval/post-processing systems 313. However, the plurality of client systems 319 comprise retrieval/post-processing systems 313 and no collection systems 311.

The plurality of client systems 303 collect travel data and deliver the collected data to the storage and processing system 317 via the communication infrastructure 315. The storage and processing system 317 also receives collected travel data from the supporting collection systems 305. These collection processes may occur periodically and/or in real time.

To support the pluralities of client systems 303 and 319, the storage and processing system 317 correlates, combines and otherwise processes the collected travel data to generate processed data and instructions. The processed data and instructions are delivered to the pluralities of client systems 303 and 319 via the communication infrastructure 315 for post-processing. Post-processing by the pluralities of client systems 303 and 319 may include, for example, communicating the processed data to the user, further computation, control and storage.

Some of the pluralities of client systems 303 and 319 are installed in roadway vehicles. Others of the pluralities of client systems 303 and 319 are portable devices that may be carried inside roadway vehicles. Yet other of the pluralities of client systems 303 and 319 are neither installed nor carried inside roadway vehicles. The plurality of client systems 303, installed or associated with roadway vehicles: (1) collect travel data via the collection systems 311; (2) exchange collected travel data with the storage and processing system 317, the client systems 319, others of the client systems 303, and the supporting collection systems 305; and (3) post-process travel data retrieved from the storage and processing system 317, the client systems 319, others of the client systems 303, and the supporting collection systems 305. Although the plurality of client systems 319 do not perform collection, they also post-process such retrieved and received travel data via the communication infrastructure from the systems 317, 303, 305, and other client systems 319.

The pluralities of client systems 303 and 319 may be categorized as multi-purpose or dedicated client systems. The characteristic feature of a multi-purpose client system is that it may perform various functions related to the travel data as well as additional functions that are not related to travel data. A dedicated client system can only perform functions related to the travel data.

Collection of travel data by the plurality of client systems 303 is accomplished in several ways. Some of the plurality of client systems 303 receive instructions from the systems 317, 319 and 305 and from others of the client systems 303 to deliver, or collect and deliver, certain travel data. Any of the plurality of client systems 303 may be pre-configured or instructed to regularly collect and deliver such travel data without awaiting specific requests. Such "pre-arranged" collection and delivery can occur continuously or as travel data becomes available. The collection and delivery process performed by each of the plurality of client systems 303 may be activated or deactivated via the communication infrastructure or through direct interaction with the client systems 303. The retrieval and post-processing of the plurality of client systems 303 may be similarly activated or deactivated.

Another way for collecting information is for the plurality of client systems 303 to automatically initiate collection (and subsequent delivery) of travel data. For example, upon sensing motion, periodic collection and delivery might be automatically initiated by the client systems 303. Such client system 303 might also periodically collect and deliver the moving vehicle's geographic location, its speed, direction and other travel data. Alternatively, the plurality of client systems 303 may be triggered manually to initiate collection and/or delivery of travel data.

After processing travel data delivered by one of the plurality of client systems 303, the storage and processing system 317 may return processed travel data and/or instructions to the delivering one of the plurality of client systems 303. In addition, the storage and processing system 317 delivers the processed travel data and related instructions to others of the pluralities of client systems 303 and 319. For example, processed travel data may be delivered to one of the client systems 303 in response to travel data collected from another of the client systems. Any of the pluralities of client systems 303 and 319 that receive the processed travel data or related instructions may forward same or post-process and forward post-processed data or instructions to yet others of the pluralities of client systems 303 and 319.

The roadway travel data exchange network 300 is enhanced with capability of receiving additional information that may relate to travel. Such additional travel-related information may be collected by supporting collection systems 305. For example, various governmental agencies or news organizations will have the capability to contribute travel-related data. Governmental agencies that may contribute travel-related data to the roadway travel data exchange network include, for example, a local city police department, a state police department, a sheriff's department, a highway patrol, and a meteorological agency. The travel-related data may be collected by using a client system 303, in a similar manner as discussed above. The travel-related data may comprise, for example, information about the number of vehicles that pass through a certain part of a road, vehicle speed, and direction of travel. If the travel-related data is collected by the governmental agency representative using a device similar to a client system 303, the device may automatically collect and transmit the travel-related data to the storage and processing system 317 for further processing. The governmental agency representative may also collect travel-related data by observation and then enter it into the roadway travel data exchange network by transmitting it directly to the storage and processing system 317. For example, a police officer may be monitoring a busy road intersection and may observe a traffic accident. As a result of the accident, all lanes of the road may become blocked and traffic flow may quickly deteriorate. The police officer may then transmit to the storage and processing system 317 his exact location and the fact that the specific road has been blocked in both directions due to a traffic accident.

The supporting collection systems 305 may comprise, for example, weather-related data collection systems. The weather-related data may be automatically collected by weather sensors placed at key intersections, highways, or roads. The weather-related data may include, for example, outside temperature, precipitation amount and emergency weather data (such as information for an approaching tornado). Certain weather-related data may be entered into the roadway travel data exchange network and transmitted to the storage and processing system 317 via a client system 303. The supporting collection systems 305 may also comprise a meteorological data collection system that delivers travel data in the form of actual or predictive weather information to the storage and processing system 317.

The supporting collection systems 305 also deliver travel data directly to the client systems 303 and 319 for post-processing via the communication infrastructure 315. Instructions may also be delivered by the supporting collection systems 105 to the storage and processing system 317 or the client systems 303 and 319 via the communication infrastructure 315.

The pluralities of client systems 303 and 319 have display capabilities so that collected and processed travel data may be displayed for a user as part of the post-processing functionality of the retrieval/post-processing systems 313. For example, some of the plurality of client systems 303 transmit geographic location (corresponding to either the location of the client system or any other selected location) or route information (corresponding to either the current route of the client system or any other selected route) to the storage and processing system 317, requesting related weather and speed information. In response to such request, the storage and processing system 317 uses the information to access stored travel data to produce the related weather and speed information for delivery to the requesting client system.

The communication infrastructure 315 may comprise a single communication network or a plurality of communication networks. Such networks may comprise wired and wireless portions. More specifically, collection of information and transmission of the collected information via the communication infrastructure 315 may be accomplished by using wireless transmission methods, such as General Packet Radio Service (GPRS) or Wideband Code Division Multiple Access (WCDMA). Collection and transmission on the communication infrastructure 315 may also be accomplished using radio, 802.11 network, ultrawideband communication, or any other means that allow sufficient freedom of movement. Delivery of information on the communication infrastructure 315 can be accomplished by using the same wireless transmission methods that are used for transmission of the collected information. In addition, delivery via the communication infrastructure 315 may be accomplished by using a cable infrastructure, a satellite network infrastructure, a digital subscriber line (DSL) infrastructure, an Internet infrastructure, an intranet infrastructure, a wired infrastructure, a closed communication infrastructure, and a local area network. Complimentary technology exists on the roadway travel data exchange network 300, including the storage and processing system 317, and the client systems 303 and 319 in order to use the communication infrastructure and process travel data on the roadway travel data exchange network.

In an embodiment of the present invention, the roadway travel data exchange network may comprise a plurality of storage and processing systems. For example, in order to increase efficiency in the exchange of information, a storage and processing system may be placed near several major roads or intersections so that travel data may be reported to the storage and processing system which is closest to the reporting vehicle. The plurality of storage and processing systems may be connected together, or to a main storage and processing system, via the communication infrastructure 315. The plurality of processing systems may each be deployed to provide different services or portions of an overall service offering. In such cases, the client systems may employ post-processing that correlates or otherwise combines the services or service information delivered by the plurality of processing systems.

In another embodiment of the present invention, a plurality of client systems 303 may be utilized, as well as a plurality of client systems 319. Travel data that is collected by one or more of the collection systems 311 on the client systems 303 may be transmitted to, and processed by, a storage and processing system. Subsequent results may be utilized by the same client systems 303 which collected the travel data, or by other client systems 303. The same results, however, may also be utilized by one or more of the retrieval/post-processing systems 313 on the plurality of client systems 319.

Figure 4:
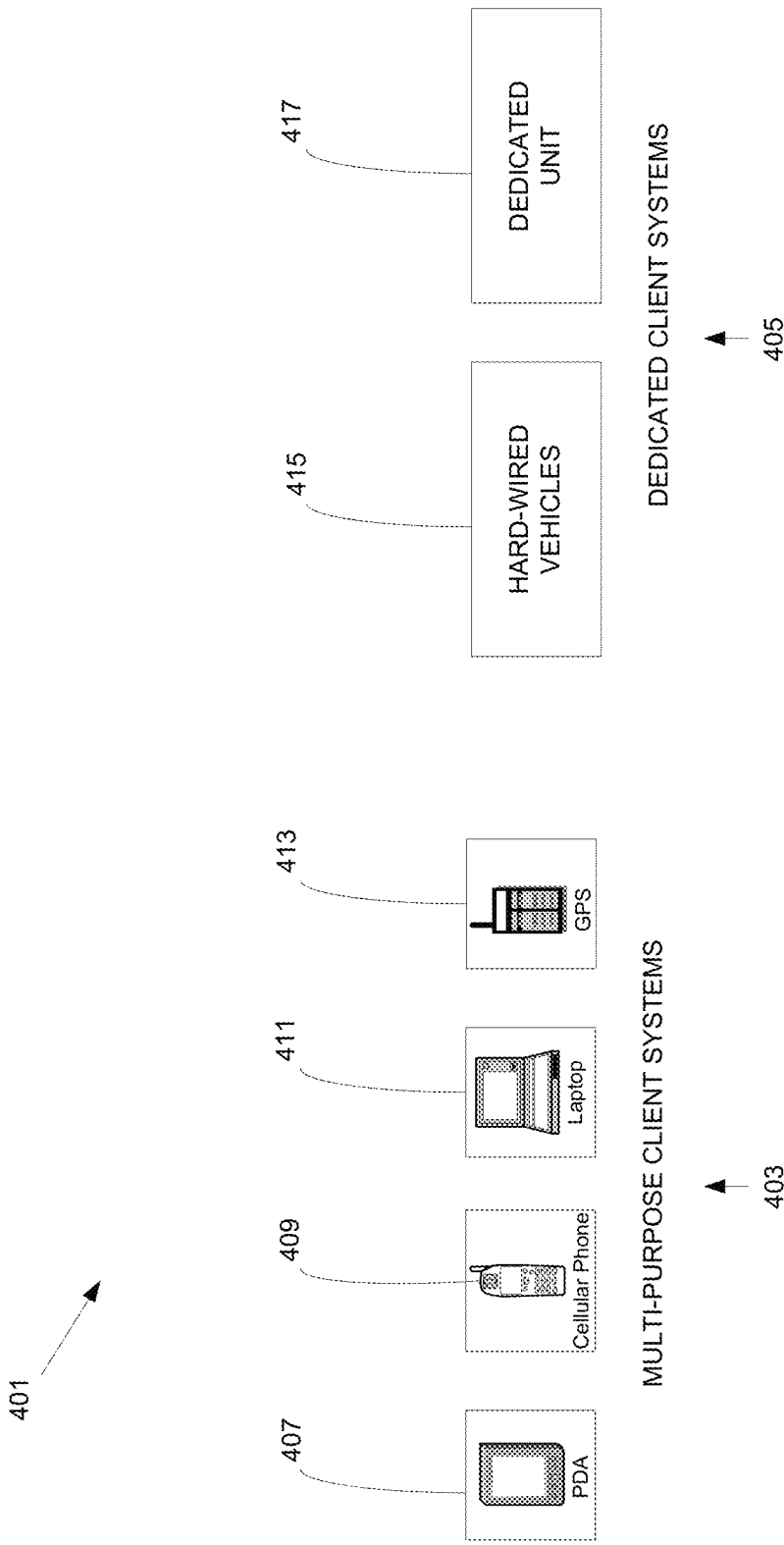
FIG. 4 is a diagram illustrating a plurality of client systems on the roadway travel data exchange network of FIG. 3, for example, in accordance with various aspects of the present invention.

FIG. 4 is a diagram illustrating a plurality of client systems on the roadway travel data exchange network of FIG. 3, for example, in accordance with various aspects of the present invention. The plurality of client systems 401 may comprise one or more of the multipurpose client systems 403 and/or one or more of the dedicated client systems 405. More specifically, the multipurpose client system 403 may be, for example, one or more of a personal digital assistant (PDA) 407, a cellular phone 409, a laptop computer 411, and a global positioning system (GPS) device 413. The multipurpose client system 403 is enabled to collect, transmit, receive and deliver travel data. However, the multipurpose client system 403 may perform additional functions as well. For example, the PDA 407 may store and recall personal information. The dedicated client system 405 may only perform functions related to the travel data. The dedicated client system 405 may comprise a client system 415 physically embedded ("hardwired") in the vehicle. A dedicated client system 405 may also be designed as a portable dedicated unit 417.

Figure 5:
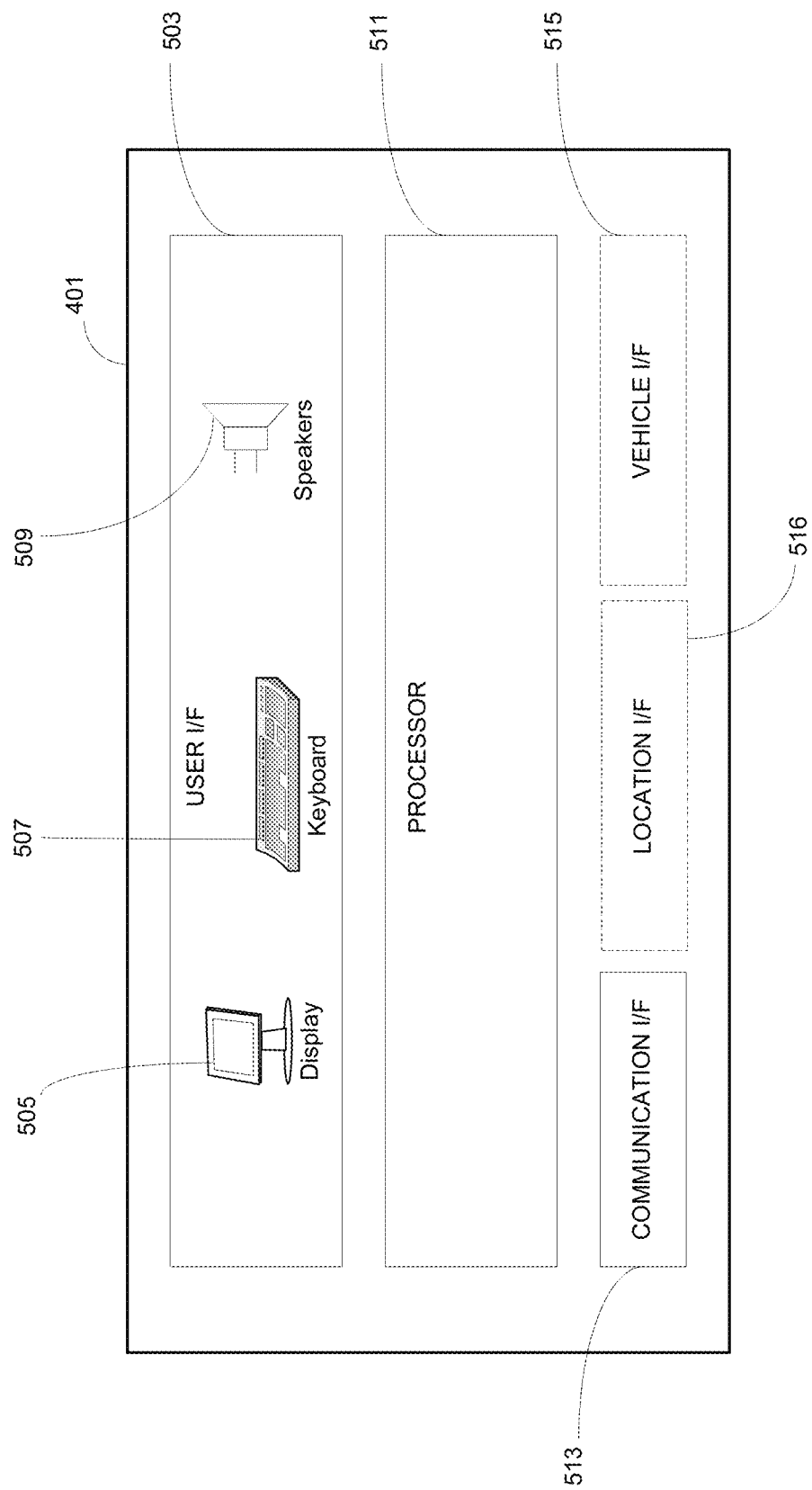
FIG. 5 is a diagram illustrating a more specific embodiment of a client system on the roadway travel data exchange network of FIG. 3, for example, in accordance with various aspects of the present invention.

Referring now to FIG. 5, there is illustrated a more specific embodiment of one of the client systems 401 in the roadway travel data exchange network of FIG. 3, for example, in accordance with various aspects of the present invention. In order to accomplish efficient exchange of travel data, the client system 401 comprises a user interface 503, a processor 511 and a communication interface 513.

The client system 401 is adapted to collect, transmit, receive and deliver travel data. Where the client system 401 is "dedicated" or embedded in a vehicle, a vehicle interface 515 supports the collection of travel data related to the vehicle in which it is embedded. Such travel data may comprise, for example, information on the vehicle speed, tire pressure, airbag deployment, etc.

In the present embodiment, geographic location information of a vehicle is determined through location circuitry. If the location circuitry is present in the vehicle in which the client system is located, then the location circuitry will deliver the geographic location information to the client system 401 via the vehicle interface 515. However, if the vehicle lacks location circuitry, the client system 401 may comprise location circuitry within a location interface 516. For example, in one embodiment, the location interface 516 comprises GPS (Global Positioning System) circuitry. In other embodiments, geographic location may be determined by any sufficiently reliable mechanisms for determining location, such as mechanisms employing triangulation techniques. The GPS circuitry may also assist in determining speed and direction of a vehicle if such travel data may not be collected directly via the vehicle interface 515.

The user interface 503 comprises a keyboard 507, which may be used to enter travel data manually or otherwise interact with the client system 401. For example, the keyboard might be used to request travel data from the storage and processing system 317 of FIG. 3. Of course, any other user input devices such as a touchscreen, mouse, buttons, dials or switches might also, or alternatively, be used.

Travel data which is delivered to the client system 401 is displayed on a display 505. The client system 401 may also provide for audible notification of the received travel data via speakers 509. Information which is entered or received via the client system 401 is processed by the processor 511. A communication interface 513 communicatively couples the client system 401 with the communication infrastructure so as to provide access to the storage and processing system 317, for example. Through the communication interface 513, processed, post-processed and collected travel data is exchanged. For example, the storage and processing system 317 delivers processed travel data to the client system 401 for display and audible output on the display 505 and speakers 509 respectively.

Figure 6:
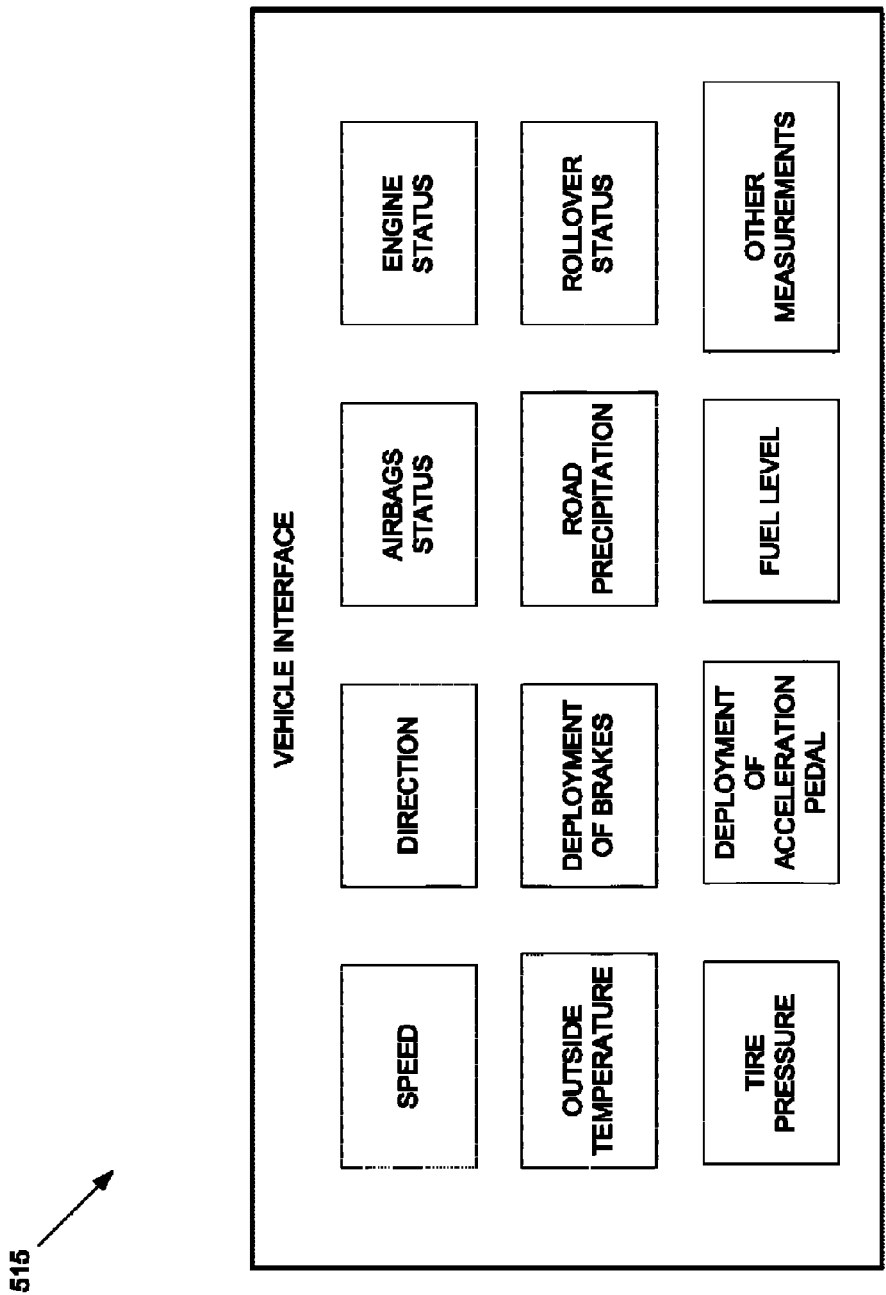
FIG. 6 is a diagram illustrating an embodiment of a vehicle interface on the plurality of client systems of FIG. 4, for example, in accordance with various aspects of the present invention.

Referring now to FIG. 6, there is illustrated a diagram of an embodiment of a vehicle interface on the plurality of client systems of FIG. 4, for example, in accordance with various aspects of the present invention. The vehicle interface 515 provides functionality for collecting travel data that is related to the vehicle in which it is embedded. Travel data that may be collected by a client system may include, for example, a geographic location, a speed, a direction, an airbag status, an engine status, an outside temperature, a deployment status of vehicle brakes, a road precipitation status, a rollover status, a tire pressure status, a deployment status of an acceleration pedal, and a fuel level.

Geographic location information of a vehicle may be determined, for example, through a GPS, such as the GPS 413 of FIG. 4. GPS may also assist in determining speed and direction of a vehicle if the client system is not embedded and such traffic data may not be collected directly via the vehicle interface 515. Speed and direction of a vehicle may be determined by measuring the vehicle's location with a GPS several times over a specific time interval. The traveled distance and time may then be calculated and may be used to determine speed and direction.

Figure 7:
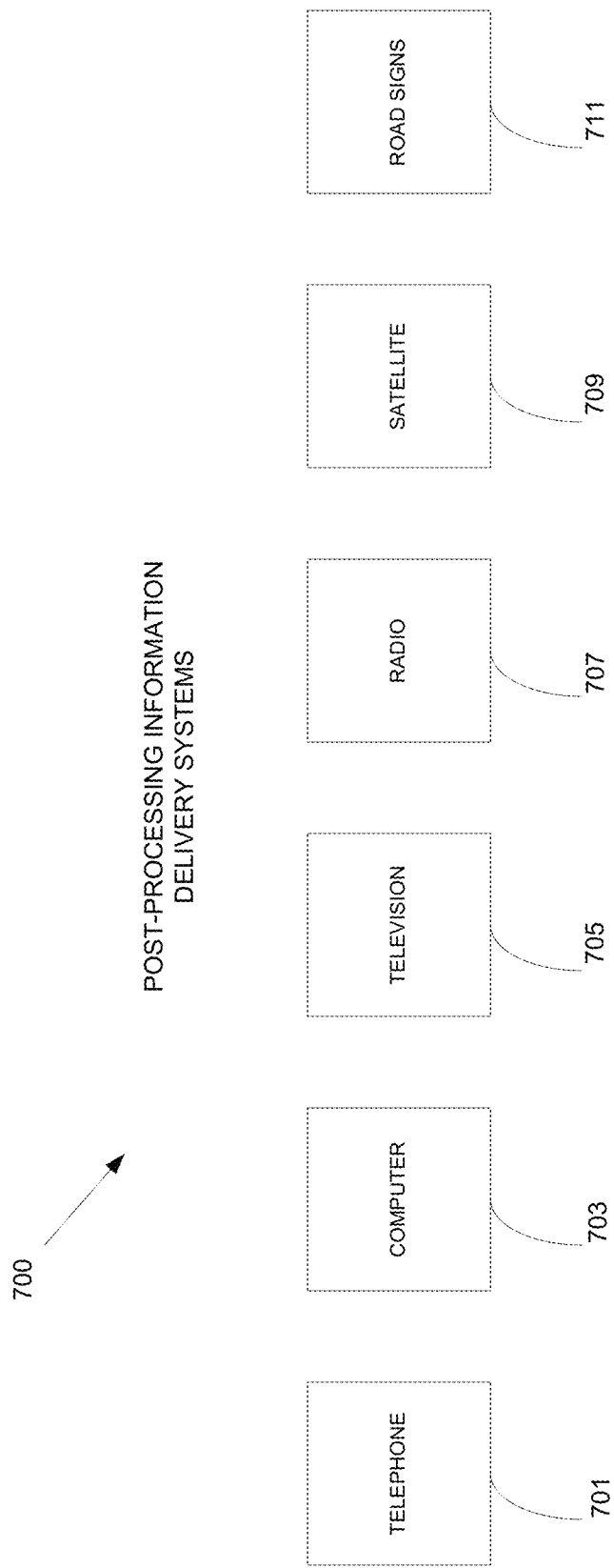
FIG. 7 is a diagram illustrating an embodiment of post-processing information delivery systems on the roadway travel data exchange network of FIG. 3, for example, in accordance with various aspects of the present invention.

Referring now to FIG. 7, there is illustrated an embodiment of post-processing information delivery systems on the roadway travel data exchange network of FIG. 3, for example, in accordance with various aspects of the present invention. Various post-processing information delivery systems 700 may be utilized in the retrieval/post-processing systems 313 of FIG. 3. Travel data communicated from the storage and processing system 317 may, for example, be delivered to a telephone 701, a computer 703, a television 705, a radio 707, a satellite 709, or a road sign display 711.

The telephone 701 may, for example, be a dedicated telephone line. Users of the roadway travel data exchange network may dial this dedicated phone line and hear a recorded message with specific travel data. The contents of the recorded message may be periodically updated with new travel data. Several post-processing information delivery systems may be utilized at the same time. For example, information about an accident may be displayed on a road sign display 711, while at the same time a radio 707 may broadcast information on alternate routes that may be utilized around the accident site.

Figure 8:
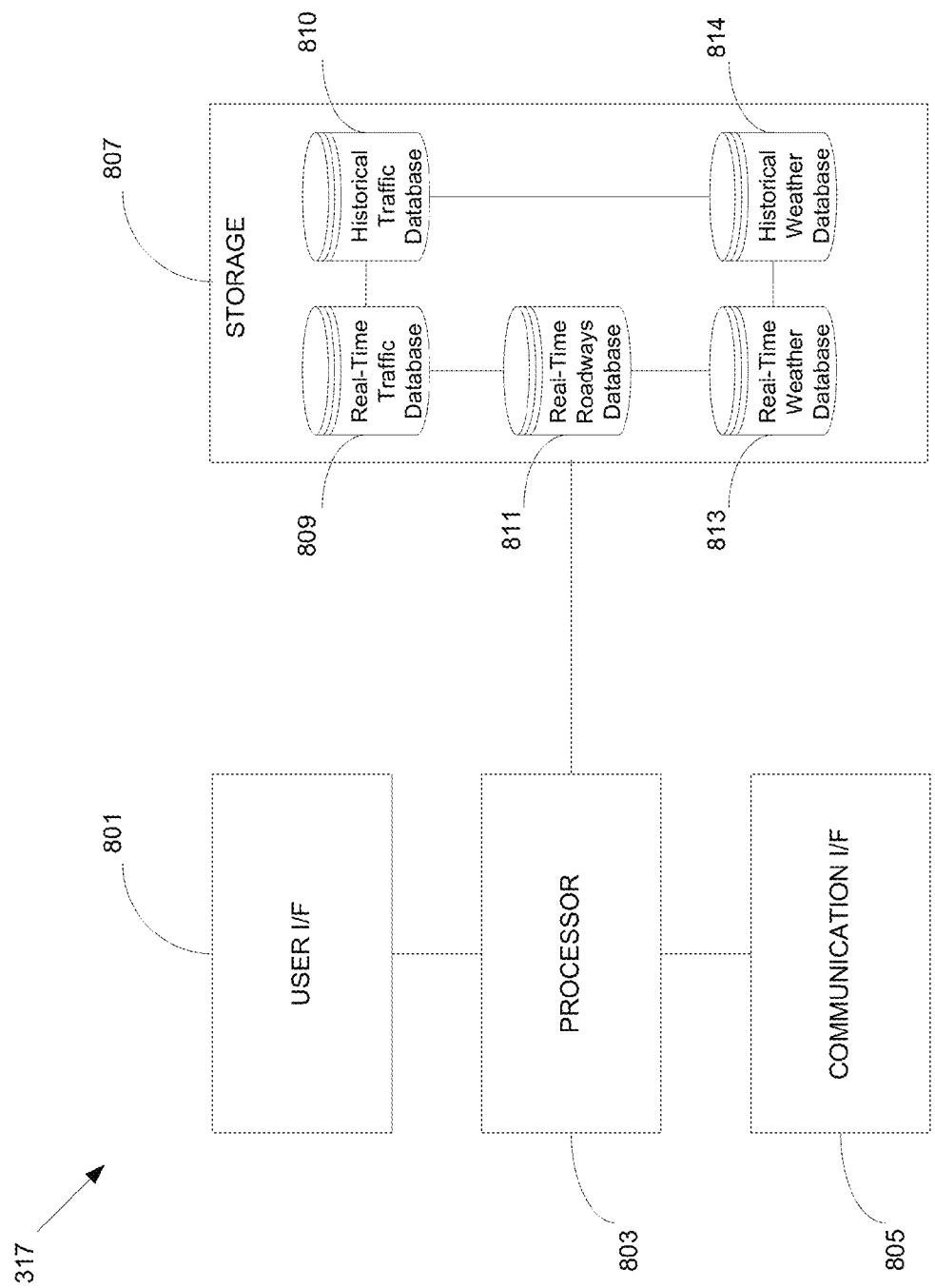
FIG. 8 is a diagram illustrating an embodiment of a storage and processing system on the roadway travel data exchange network of FIG. 3, for example, in accordance with various aspects of the present invention.

FIG. 8 is a diagram illustrating an embodiment of an information processing system on the roadway travel data exchange network of FIG. 3, for example, in accordance with various aspects of the present invention. The information processing system 317 may comprise a communication interface 805 for communicating with the roadway travel data exchange network via the communication network infrastructure 315. Real-time travel data received by the information processing system via the communication interface 805 is processed by a processor 803 and subsequently stored in storage 807.

The storage 807 may comprise several databases depending on the type of real-time travel data that is received. For example, the storage 807 may comprise a real-time travel database 809, a real-time roadways database 811, and a real-time weather database 813. The storage 807 may also comprise, for example, a historical travel database 810 and a historical weather database 814. The real-time travel database 809 may store real-time travel data and after a specific period of time may, for example, transfer such real-time travel data into the historical travel database 810. Similarly, the real-time weather data from the real-time weather database 813 may be transferred to the historical weather database 814 after a specific period of time.

The real-time travel database 809 may store all real-time travel data related to travel. The real-time roadways database 811 may store information about the specific geographic location of a roadway network and specific roadway characteristics, such as type of road, length, maximum allowed speed, number of lanes, etc. The real-time weather database 813 may store real-time weather-related data 313 that is received from a governmental input system 305. The information processing system 317 may also comprise a user interface 801, which may allow an authorized user to directly input into the information processing system travel-related, roadway-related, or weather-related information, or to edit existing information.

In an embodiment of the present invention, the roadway travel data exchange network may comprise a plurality of information processing systems. For example, in order to increase efficiency in the exchange of information, an information processing system may be placed near several major roads or intersections so that real-time travel data may be reported to the information processing system, which is closest to the reporting vehicle. The plurality of information processing systems may be connected together, or to a main information processing system, via the communication network infrastructure 315.

Figure 9:
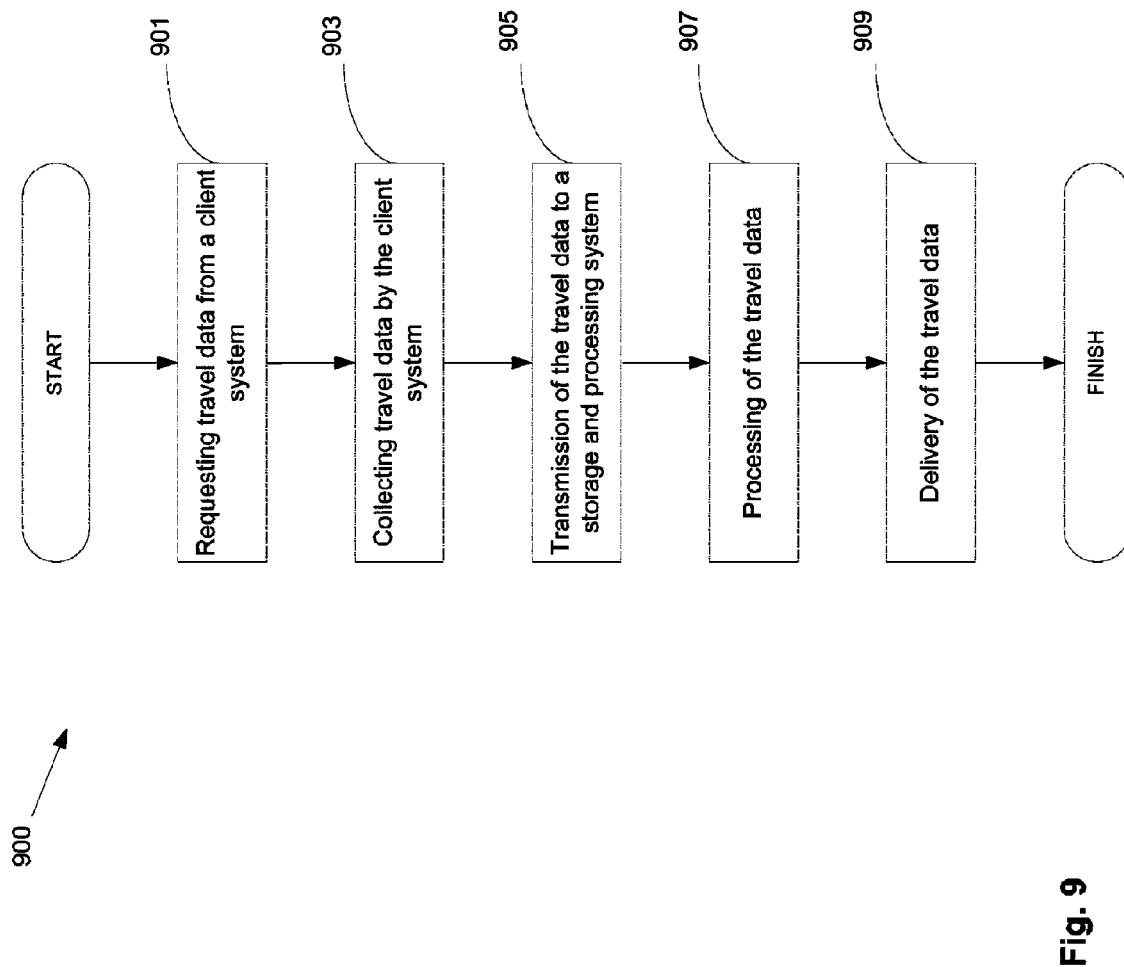
FIG. 9 is a flowchart illustrating a general embodiment of a method for collection and delivery of travel data on the roadway travel data exchange network of FIG. 3, for example, in accordance with various aspects of the present invention.

FIG. 9 is a flowchart illustrating a general embodiment of a method 900 for collection and delivery of real-time traffic data on the roadway travel data exchange network of FIG. 3, for example, in accordance with various aspects of the present invention. At 901, travel data is requested by the storage and processing system 317 from a client system. At 903, a multipurpose client system or a dedicated client system collects the requested travel data. At 905, the client system transmits the collected travel data to the storage and processing system via a communication network infrastructure. After the travel data is processed by a processor at the storage and processing system at 907, it may be stored in a storage at the storage and processing system. At 909, the travel data is delivered from the storage and processing system to the same client system or to another client system for post-processing.

Figure 10:
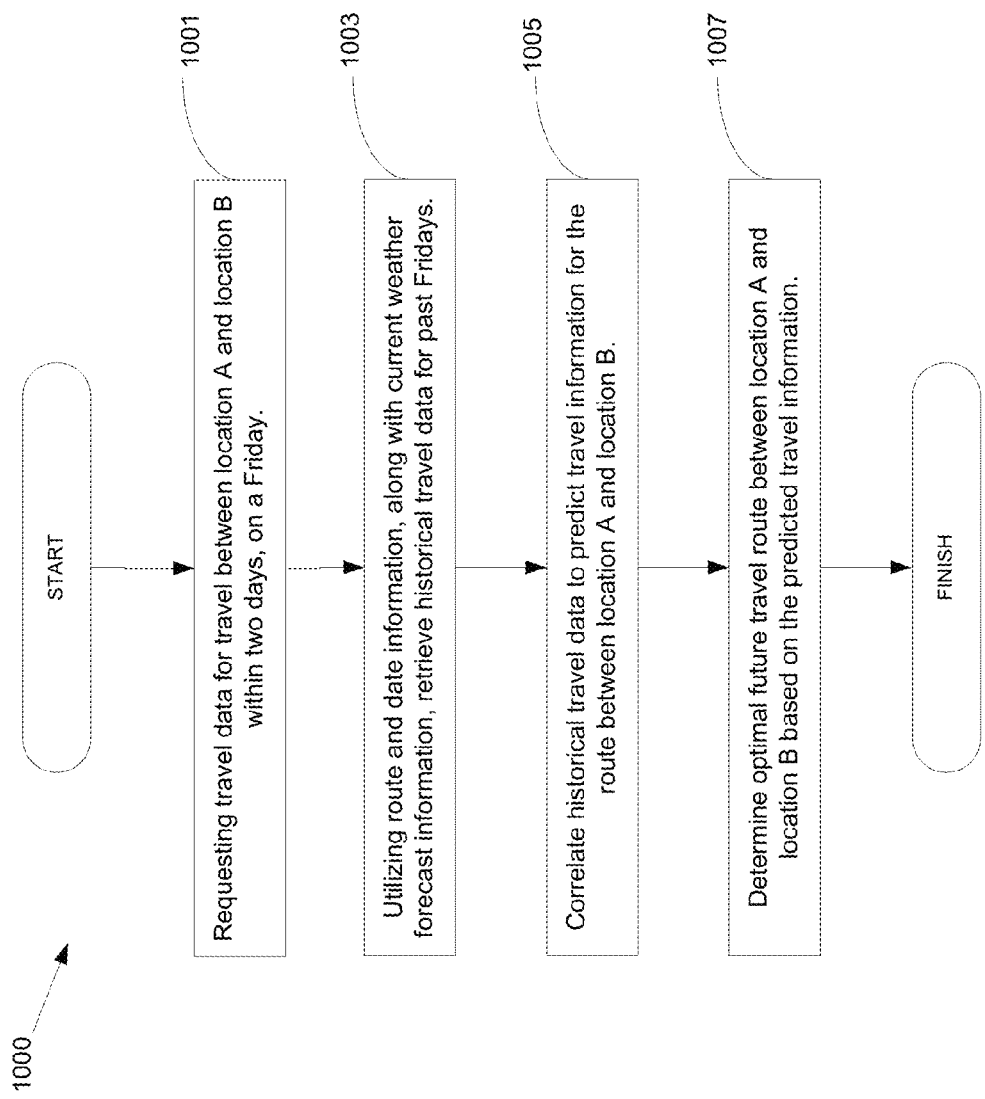
FIG. 10 is a flowchart illustrating an exemplary embodiment of a method for collection and delivery of travel data on the roadway travel data exchange network of FIG. 3, for example, in accordance with various aspects of the present invention.

FIG. 10 is a flowchart illustrating an exemplary embodiment of a method for collection and delivery of travel data on the roadway travel data exchange network of FIG. 3, for example, in accordance with various aspects of the present invention. Referring to FIG. 10, at 1001, a travel processing system and/or a client may request travel information from location A to location B for an upcoming trip that may take place in two days, for example, on a Friday. At 1003, route and date information may be utilized, along with the current weather forecast for that day, to retrieve historical travel data for past Fridays with such weather. Other available information, such as whether it is a holiday or a holiday weekend, or whether a major event is planned for that day, may also be taken into account during retrieval of the historical data. At 1005, the historical travel data may be correlated to predict travel information for the applicable route between location A and location B. At 1007, the travel processing system and/or the client may then determine an optimal future travel route for the desired travel based on the predicted travel information.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for navigation along a desired route on a desired future date, the system comprising:
    a map interface configured to display a traffic condition and a travel time received via a communication network; and
    an automobile navigation network communicatively coupled to the communication network, wherein the automobile navigation network estimates the traffic condition and the travel time for travel along the desired route on the desired future date based on historical travel information, current traffic information and current weather information.

2. The system of claim 1, wherein information regarding the estimated travel conditions is automatically communicated to the map interface.

3. The system of claim 1, wherein the traffic condition comprises geographic location information.

4. The system of claim 1, wherein the traffic condition comprises route information, and wherein the historical travel information comprises historical traffic information.

5. The system of claim 1, wherein the historical traffic information is associated with a day of the week the desired future date falls on.

6. The system of claim 1, wherein the communication network comprises a broadband data packet network.

7. The system of claim 1, wherein the map interface is installed in an automobile.

8. The system of claim 1, wherein the map interface is installed in a mobile device.

9. The system of claim 1, wherein the historical travel information comprises historical weather information.

10. A method for navigation along a desired route on a desired future date, the method comprising:
    by a map interface communicatively coupled to an automobile navigation network via a communication network:
    displaying a traffic condition and a travel time received via the communication network,
    wherein the automobile navigation network estimates the traffic condition and the travel time for travel along the desired route on the desired future date based on historical travel information, current traffic information and current weather information.

11. The method of claim 10, wherein the traffic condition comprises geographic location information.

12. The method of claim 10, wherein the traffic condition comprises route information, and wherein the historical travel information comprises historical traffic information.

13. The method of claim 12, wherein the historical traffic information is associated with a day of the week the desired future date falls on.

14. The method of claim 10, wherein the communication network comprises a broadband data packet network.

15. The method of claim 10, wherein the map interface is installed in an automobile.

16. The method of claim 10, wherein the map interface is installed in a mobile device.

17. The method of claim 10, wherein the historical travel information comprises historical weather information.

* * * * *

UNITED STATES PATENT AND TRADEMARK OFFICE
CERTIFICATE OF CORRECTION

| | | |
|---|---|---|
| PATENT NO. | : 8,965,675 B2 | Page 1 of 1 |
| APPLICATION NO. | : 13/871185 | |
| DATED | : February 24, 2015 | |
| INVENTOR(S) | : Gary R. Ignatin | |

It is certified that error appears in the above-identified patent and that said Letters Patent is hereby corrected as shown below:

In the Claims

Column 12, line 2, Claim 2, please replace "estimated travel conditions" with --estimated travel condition--.

Signed and Sealed this
Eighteenth Day of August, 2015

Michelle K. Lee
*Director of the United States Patent and Trademark Office*